PHOSPHONITRILIC CHLORIDE PURIFICATION PROCESS

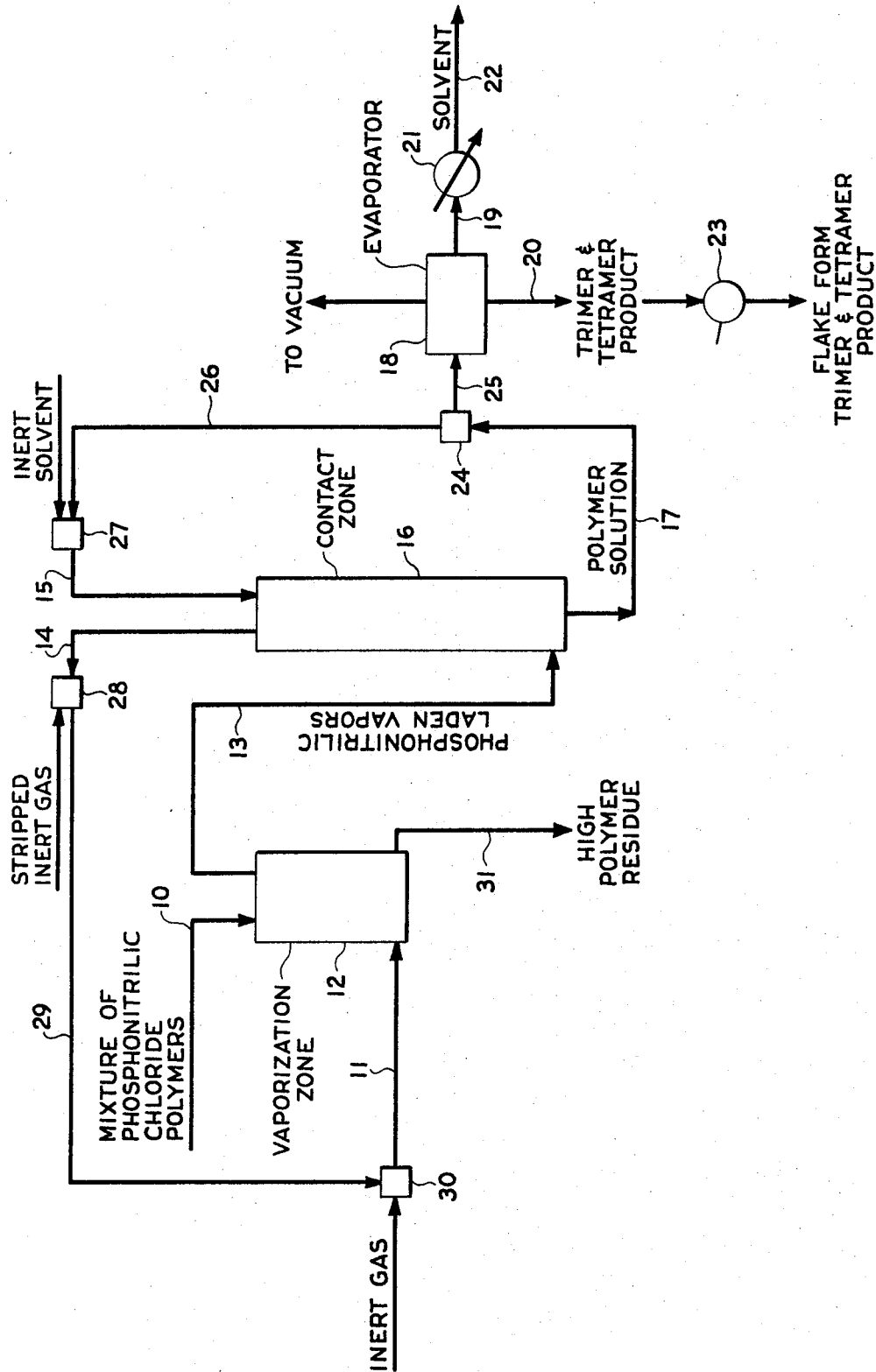

Daniel J. Jaszka, Tonawanda, and John T. Rucker, Lewiston, N.Y., assignors to Hooker Chemical Corporation, Niagara Falls, N.Y., a corporation of New York
Filed Aug. 14, 1962, Ser. No. 216,893
13 Claims. (Cl. 23—357)

This invention relates to improvements in the method of manufacturing phosphonitrilic chloride polymers whereby a high proportion of cyclic phosphonitrilic chloride polymers is produced by comparatively simple and inexpensive operation.

The formation of polymeric phosphonitrilic chlorides has been described in "Chemical Reviews," vol. 32, pp. 111 through 127 (1943) by Audreith et al. A method described is the refluxing of phosphorus pentachloride and ammonium chloride in an inert solvent. When the reaction has proceeded substantially to completion, a mixture of polymers is obtained. This mixture consisting of (a) cyclic phosphonitrilic chloride polymers $(PNCl_2)_n$ where $n$ is a positive integer of three or more and (b) linear $PNCl_2$ chains end blocked with the elements of phosphorus pentachloride and of the probable formula $(PNCl_2)_n \cdot PCl_5$.

Typical proportions, expressed as percentages by weight, of the two types of polymers obtained by this method are 75 to 85% of cyclic polymer and 15 to 25% of linear polymer. Furthermore, the proportions of the individual cyclic polymers found in the crude mixture of cyclic and linear polymers are approximately 30 to 35% of the trimer $(PNCl_2)_3$, 10 to 20% of the tetramer $(PNCl_2)_4$ and 30 to 40% of the higher cyclic polymers, the percentages of various polymers being expressed as percentages by weight. The proportions of the two types of polymers may be varied to some extent by varying the amounts of phosphorus pentachloride and ammonium chloride used.

The trimer and tetramer phosphonitrilic chloride polymers are in demand because of their elastic, heat and fire resistant qualities in applications such as coatings for ceramics and metals, fireproofing of textiles, additives for increasing heat resistance and as a raw material in preparing thermally stable resins. Accordingly, it is necessary to provide suitable methods of recovery of the lower cyclic polymers if their commercial manufacture is to be economically feasible.

We have found that employing a novel distillation technique in preparing phosphonitrilic polymers increases the yields of trimeric and tetrameric phosphonitrilic chloride crystals.

Accordingly, it is an object of this invention to provide a simplified, yet inexpensive process for the production of phosphonitrilic chloride polymers assaying high in the trimeric and tetrameric cyclic polymers. A further object is to eliminate the undesirable modification of the trimeric and tetrameric cyclic polymers caused by known methods of purification of crude polymers. Other objects will become apparent to those skilled in the art upon reference to the following detailed descriptions and example, reference being had to the accompanying drawing which is a flow sheet of our process for manufacturing phosphonitrilic chlorides.

This invention provides a novel method of selectively purifying crude phosphonitrilic chloride polymers to obtain trimer and tetramer cyclic phosphonitrilic chloride polymers which comprises providing a molten mixture of crude phosphonitrilic chloride polymers obtained by the reaction of phosphorus pentachloride and ammonium chloride (preferably from which all unreacted raw materials, catalysts and contaminants have been removed), passing a hot inert gas through the crude mixture, contacting the thus produced phosphonitrilic polymer-laden gas with an inert solvent to produce a solution of polymer in said inert solvent, and afterward separating the solvent from said solution by conventional means to obtain the phosphonitrilic chloride crystals as a product.

Our invention is shown schematically in the figure. A mixture of phosphonitrilic chloride polymers is charged through conduit 10 to a vaporization zone 12. Inert gas is introduced via conduit 11 and passed through said polymers, the higher polymer residue exits via conduit 31, and phosphonitrilic polymer-laden vapors exit via conduit 13 and enter contact zone 16 at the bottom. The vapors rise upwards and are countercurrently contacted with an inert solvent introduced through conduit 15. The stripped inert gas exhausts at the top via conduit 14 and the phosphonitrilic polymers dissolved in the solvent leave the bottom of the contact zone through conduit 17, valving means 24 and conduit 25 as a polymer solution which is transferred to an evaporator 18 where the trimer and tetramer product is separated via conduit 20 in the liquid state from the vaporized solvent which exists via conduit 19. The vapor is passed through condenser 21 and recovered as a liquid solvent in conduit 22. The said trimer and tetramer product pass to a flaker 23 where the product is cooled and made into flakes. When recirculating the polymer solution to the contact zone, the polymer solution leaves the bottom of the contact zone through conduit 17 and valving means 24 and is transferred via conduit 26 to valving means 27 where the solution enters conduit 15 for reentry into the contact zone. When recirculating the inert gas, the gas is removed from conduit 14 via valving means 28 to conduit 29 and admitted to conduit 11 via valving means 30.

The usual method of preparing phosphonitrilic chloride employs the reaction of phosphorus pentachloride with an excess of ammonium chloride in the presence of a suitable solvent.

The solvent has a boiling point which allows the reaction of phosphorus pentachloride and ammonium chloride to proceed preferably under reflux conditions, is inert to the raw materials and reaction products and also an effective solvent for phosphorus pentachloride. Lastly, the boiling point is sufficiently low that the solvent may be removed afterwards from the phosphonitrilic polymers without causing further polymerization. We prefer to use monochlorobenzene as the solvent in our invention although other chlorinated hydrocarbon solvents or phosphorus oxychloride can be used. Among other satisfactory solvents are trichlorobenzenes, orthodichlorobenzene, sym-tetrachloroethane and tetrachloroethylene. Still other useful solvents are benzyl-chloride, chloroform and carbon tetrachloride. Monochlorobenzene is a suitable solvent since it offers a comparatively low boiling point, is economical, less toxic then tetrachloroethane, and readily available. An important factor in the rate of reaction to form phosphonitrilic chloride is the reaction temperature, therefore, the chlorinated hydrocarbon solvent used should at atmospheric pressure boil at 100° C. or higher.

The general relationship of temperature to composition of phosphonitrilic polymers formed has been demonstrated. As the temperature is increased up to about 300° C. progressively higher amounts of the higher cyclic phosphonitrilic chloride polymers are formed. We have found it necessary to control the temperature through all steps of our invention if the objects of the invention are to be achieved. From the table of solvent boiling points below it will be seen that various temperatures may be obtained by appropriate choice of solvent employed during the reaction and clarification steps.

| Solvent: | B.P., °C. |
|---|---|
| Chloroform | 61 |
| Carbon tetrachloride | 77 |
| Phosphorus oxychloride | 107 |
| Tetrachloroethylene | 121 |
| Monochlorobenzene | 132 |
| Sym-tetrachloroethane | 146 |
| Benzyl chloride | 179 |
| O-dichlorobenzene | 180 |
| Trichlorobenzenes | 208–218 |

Paddock and Searle in Canadian Patent 614,267 (1961) disclose certain anhydrous metallic salts which materially speed the reaction. Also present in the phosphonitrilic chloride are contaminants from the reaction vessel and impurities from the reactants, as well as unreacted ammonium chloride. Thus, the resulting polymers contain objectionable amounts of foreign matter which can promote further polymerization in subsequent processing steps.

An absorbent medium such as Fuller's earth when refluxed with the reaction product liquor containing the contaminants and phosphonitrilic chloride in the reaction vessel for a short period effectively absorbs the contaminants and after filtration, only the phosphonitrilic chloride remains in solution. Bone char, silica gel, bauxite and acid treated clays can also be used in the clarification and beneficiation step. In one method, the absorbent medium is introduced into the reaction zone after the reaction is completed, and refluxing is continued until the product liquor in the reaction zone is clear. Alternatively, the reaction product is transferred to a separate treatment zone for the clarification step. The methods involving refluxing during the clarification step also serve to liberate residual amounts of hydrochloric acid gas entrapped in the product liquor. In still another method, the product liquor is passed through a fixed bed of the absorbent medium. The clarified product liquor may be separated from the solids contained therein by passing the hot liquor through a filter. Of the classes of filters, i.e., vacuum, pressure and gravity, vacuum is preferred, although gravity may be used without difficulty. In keeping with good engineering practice, filter aids such as diatomaceous earth may be used to increase filtration rate. Conventional filtration media are suitable for this process.

The filtered solution of phosphonitrilic polymers and solvents is effectively separated into a polymer phase and a solvent phase by conventional means. Advantageous use of vacuum to effect separation below the solvent boiling point materially helps to avoid further polymerization of the phosphonitrilic chloride polymers, however, for reasons previously indicated it is generally desirable to effect the separation at temperatures less than 140° centigrade.

Preferably the temperature employed during the reaction and clarification of the crude phosphonitrilic chloride polymers should be between 100° and 150° centigrade so that the greatest possible amount of trimer phosphonitrilic chloride may be formed.

The temperature employed to maintain the phosphonitrilic chloride polymers in a liquid phase in the vaporization zone should not exceed 170° centigrade to avoid further polymerization. We prefer to maintain the temperature from 120° to 140° centigrade.

The gas used in the method of the invention must be inert with respect to phosphonitrilic chloride and preferably free of water. The inert gases classified in the periodic chart as column 0, i.e., helium, argon, etc., and air, methane, nitrogen and carbon dioxide and mixtures thereof may be used in the practice of this invention. The actual volume, pressure and rate of flow are governed by the chemical engineering requirements of the equipment used in the employment of this invention.

Temperature of the inert gas is less critical since the phosphonitrilic vapors remain in the gas for such a short time. The selected temperature should be between ambient temperature to 200° C. and sufficiently warm so as to allow the liquid phosphonitrilic polymers to remain in a liquid phase while said gas is passed through in the particular equipment used to carry out the invention.

The contacting means for contacting the phosphonitrilic chloride laden vapors with the inert solvent is known to the chemical engineering profession under names such as packed column, bubble tower, chiller tower, scrubbers, etc. The typical embodiment consists of cylindrical walls, a vapor inlet at the bottom, a solution outlet at the bottom, a gas outlet at the top, a solvent inlet at the top, and a series of trays or baffles arranged over the entire height of the contact means so that there is maximum exposure of the vapors to the solvent.

The solvent is preferably at ambient temperature for contacting with the phosphonitrilic polymer-laden gas, although solvent temperatures in the range of 0 to 100° C. but less than the solvent's boiling point can be used.

After the trimer and tetramer phosphonitrilic products are separated from the polymer solution by means previously discussed, it is convenient to chill and flake said warm to molten products. This may be accomplished by thinly spreading out the said product on a cooled, moving inert surface and by removing the solidified product from the surface by a scraping means. Said chilling and flaking means may be embodied in conventional flaker units utilizing an internally cooled revolving drum and a stationary breaker bar set very close to the surface of said drum. Efficiency of this invention is maintained, even though the equipment available, operating conditions and process economics change, by recirculating the polymer solution emerging from the contact zone until the polymer concentration has been increased several fold before the solution proceeds to the evaporator. A suitable polymer concentration is 15 percent although polymer concentrations up to 35 percent may be used without difficulty. An increase in efficiency may be realized by recirculating the inert gas to the vaporization zone so as to retain any residual phosphonitrilic chloride not removed by the solvent washing. These features are included on the accompanying flow sheet.

The process takes advantage of the vapor pressures which the trimer and tetramer cyclic phosphonitrilic chloride polymers exhibit in a molten product at temperatures where no polymerization occurs. The extent to which vaporization is allowed to proceed determines the composition of the purified product.

The practice of this invention is illustrated by, but not limited by the examples given below.

*Example 1*

Crude phosphonitrilic chloride material analyzing 61/22/17 (percent trimer/tetramer/higher cyclics) was charged into a pot and heated and maintained at 135° C. Nitrogen gas was pumped into the molten crude through a glass diffuser at 16.5 liters per minute to vaporize trimer and tetramer. The gas stream leaving the pot was passed into a packed tower through which recirculated monochlorobenzene solution was charged countercurrent to the gas stream. The mono-chlorobenzene solution in the scrubbing system was replaced with fresh monochlorobenzene at definite intervals. Flash distillation at reduced pressure was employed to free the resulting products of monochlorobenzene.

Below are the results:

| Yield of Distillate Per Unit of Crude Charged, Percent | Percent Trimer Recovered Per Unit of Crude | Phosphonitrilic Chloride Polymer Composition (Percent) | | | | | |
|---|---|---|---|---|---|---|---|
| | | Distillate | | | Bottom | | |
| | | Trimer | Tetramer | Higher cyclic | Trimer | Tetramer | Higher cyclic |
| 37 | 55 | 93 | 6 | 1 | | | |
| 55 | 81 | 92 | 6 | 2 | | | |
| 67 | 96 | 90 | 9 | 1 | 4 | 44 | 52 |

Bottoms were unpolymerized tan mixture of crystals and oils.

Example 2

To a heated packed column at 150° C., molten phosphonitrilic chloride at 130° C. and analyzing 65/21/14 (percent trimer/tetramer/higher cyclics) was added dropwise at a rate of 5 grams per minute. Simultaneously nitrogen at 16 liters per minute preheated to 195° C. was passed countercurrent to the crude. The resultant gas stream emerging from the tower was treated identically as in the first example.

A white product in 79% yield analyzing 78/18/3 (percent trimer/tetramer/higher cyclics) was obtained from the monochlorobenzene solution and light tan unpolymerized bottoms containing no trimer and only 10% tretramer were recovered from the tower bottom. Bottoms were unpolymerized.

Example 3

Crude phosphonitrilic chloride material analyzing 61/22/17 (percent trimer/tetramer/higher cyclics) was charged into a pot heated and maintained at 135–140° C. Air was pumped into the molten crude through a glass diffuser at 16.5 liters per minute to vaporize trimer and tetramer polymers. The resultant air stream emerging from the vaporization zone was treated identically as in the first example. A product containing 95% trimer was obtained.

Example 4

Crude phosphonitrilic chloride material analyzing 90% cyclics (75% trimer/11% tetramer/19% higher) and 10% linear was charged into a pot heated and maintained at 137° C. Inert gas (85% nitrogen/15% carbon dioxide) was pumped into the molten crude to vaporize trimer and tetramer polymers. The resultant gas stream emerging from the vaporization zone had a temperature of 126° C. and was treated identically as in the first example. A product containing 94% trimer and 5% tetramer was obtained.

Various changes and modifications may be made in the method and apparatus of this invention, certain preferred forms of which have been herein described without departing from the spirit and scope of this invention. These modifications are to be regarded as within the scope and purview of this invention.

We claim:

1. The method of purifying crude phosphonitrilic chloride polymers to obtain trimeric and tetrameric cyclic phosphonitrilic chloride polymers which comprises passing inert gas through molten phosphonitrilic chloride polymer sufficiently to obtain said inert gas laden with trimeric and tetrameric cyclic phosphonitriles chloride polymers, said molten polymer being at a temperature of up to about 170° centigrade, contacting the resulting polymer-laden gas with an inert solvent separate from said molten polymer, said contacting being sufficient to produce a solution of said phosphonitrilic chloride polymer in said solvent, said separate inert solvent being maintained at a temperature less than the boiling temperature of said separate inert solvent, and subsequently vaporizing the separate inert solvent from the said solution sufficiently to obtain trimeric and tetrameric cyclic phosphonitrilic chloride polymer crystals as a product.

2. The method according to claim 1 wherein the inert gas is selected from the group consisting of air, methane, nitrogen, carbon dioxide and mixtures thereof.

3. The method of purifying crude phosphonitrilic chloride polymers to obtain trimeric and tetrameric cyclic phosphonitrilic chloride polymers which comprises passing inert gas through molten phosphonitrilic chloride polymer sufficiently to obtain said inert gas laden with trimeric and tetrameric cyclic phosphonitriles chloride polymers, said molten polymer being at a temperature of up to about 170° centigrade, contacting the resulting polymer-laden gas with a dilute solution of said cyclic polymers in an inert solvent separate from said molten polymer, said contacting being sufficient to produce a more concentrated solution of said cyclic polymers in said solvent, said separate inert solvent being at a temperature below the boiling temperature of said separate inert solvent, and subsequently vaporizing the separate inert solvent from said solution sufficiently to obtain the trimeric and tetrameric cyclic phosphonitrilic chloride polymer crystals as a product.

4. The method for the preparation of mixtures of cyclic phosphonitrilic chloride trimer and tetramer which comprises reacting phosphorus pentachloride with ammonium chloride in the presence of a first inert solvent, said reacting being sufficient to obtain a polymer product comprising phosphonitrilic chloride trimer and tetramer, vaporizing the first inert solvent from the resulting product liquor sufficiently to obtain phosphonitrilic chloride products, heating said products to a temperature of up to about 170 degrees centigrade sufficiently to obtain said products in a molten state, passing inert gas through said molten products sufficiently to obtain said inert gas laden with trimeric and tetrameric cyclic phosphonitrilic chloride polymers, contacting the resulting polymer-laden gas with a second inert solvent sufficiently to produce a solution of cyclic phosphonitrilic chloride polymer in said second solvent, the temperature of said second solvent being less than the boiling temperature of said second solvent, and subsequently vaporizing the second solvent from the said solution sufficiently to obtain the phosphonitrilic chloride polymer crystals as a product.

5. The method for the preparation of mixtures of cyclic phosphonitrilic chloride trimer and tetramer which comprises reacting phosphorus pentachloride with ammonium chloride in the presence of a first inert solvent sufficiently to obtain a polymer product liquor comprising phosphonitrilic chloride trimer and tetramer, clarifying the resulting polymer product liquor by treatment with an absorbent medium, vaporizing the first solvent from said clarified liquor sufficiently to obtain the phosphonitrilic chloride products, heating said products to a temperature of up to about 170 degrees centigrade, passing inert gas through said molten products sufficiently to obtain said inert gas laden with trimeric and tetrameric cyclic phosphonitrilic chloride polymers, contacting the resulting polymer-laden gas with a second inert solvent sufficiently to produce a solution of said polymer in said second inert solvent, said second inert solvent being at a temperature below ihe boiling point of said second inert solvent, and subsequently vaporizing the second inert solvent from said solution sufficiently to obtain phosphonitrilic chloride polymer crystals as a product.

6. The method for preparing substantially pure cyclic phosphonitrilic chloride trimer and tetramer of the formula $(PNCl_2)_n$ where $n$ is an integer from 3 to 4, which comprises adding a solution of phosphorus pentachloride dissolved in a hot first inert solvent to a slurry of ammonium chloride in inert second solvent under reflux conditions and permitting the reaction to proceed substantially to completion sufficiently to obtain a product liquor comprising a phosphonitrilic polymer, subsequently clarifying the product liquor by the addition of an absorbent medium to said liquor followed by filtration of the absorbent media from said liquor and thereafter evaporating the inert first and second solvents from said liquor sufficiently to leave a residue of phosphonitrilic polymers and thereafter passing inert gas through said polymers in a molten state said molten polymers being at a temperature of up to about 170° centigrade, said passing of inert gas thru said molten polymers being sufficient to obtain said inert gas laden with trimeric and tetrameric cyclic phosphonitrilic chloride polymers, contacting the resulting polymer-laden gas with a third inert solvent sufficiently to produce a polymer solution, said third inert solvent being at a temperature below the boiling temperature of said third inert solvent, and subsequently distilling the third solvent from the said solution sufficiently to obtain phosphonitrilic chloride trimer or tetramer crystals as a product.

7. The method according to claim 6 wherein the absorbent medium is employed under refluxing conditions.

8. The method according to claim 6 wherein the absorbent medium is Fuller's earth.

9. The method according to claim 6 wherein the inert gas is heated to a temperature between 120° and 240° centigrade.

10. The method according to claim 6 wherein the third inert solvent is a chlorinated hydrocarbon having a boiling point in excess of 100° centigrade.

11. The method according to claim 6 wherein the third inert solvent is monochlorobenzene.

12. The method according to claim 6 wherein the inert gas is selected from the group consisting of air, methane, nitrogen, carbon dioxide and mixtures thereof, wherein said first and said second solvents each respectively have boiling temperatures which are sufficiently low that said first and second solvents may be removed polymers without causing any further substantial degree of polymerization, wherein said evaporating is at a temperature in the range from about 120 degrees centigrade to about 140 degrees centigrade, and wherein said gas is substantially water-free.

13. The method according to claim 6 wherein a catalyst is employed to promote the reaction between the phosphorus pentachloride and the ammonium chloride.

References Cited

UNITED STATES PATENTS

| 2,207,597 | 7/1940 | Pechukas | 203—41 |
| 2,731,081 | 1/1956 | Mayner | 203—49 XR |

FOREIGN PATENTS

| 1,220,716 | 1/1960 | France. |
| 905,315 | 9/1962 | Great Britain. |

OTHER REFERENCES

Mellor: "Comprehensive Treatise on Theoretical and Inorganic Chemistry," 1928, vol. (VIII), pp. 721–724.

MILTON WEISSMAN, *Primary Examiner.*